United States Patent [19]

Krohn et al.

[11] Patent Number: 4,595,663

[45] Date of Patent: Jun. 17, 1986

[54] SINTERED CERAMIC SHAPED ARTICLE WHOLLY OR PREDOMINANTLY OF EUTECTIC MICROSTRUCTURE CONSTITUENTS

[75] Inventors: Ulrich Krohn, Leonberg; Hans Olapinski, Aichwald; Ulf Dworak, Baltmannsweiler, all of Fed. Rep. of Germany

[73] Assignee: Feldmühle Aktiengesellschaft, Düsseldorf, Fed. Rep. of Germany

[21] Appl. No.: 569,394

[22] Filed: Jan. 9, 1984

Related U.S. Application Data

[63] Continuation-in-part of Ser. No. 271,216, Jun. 8, 1981, abandoned.

[30] Foreign Application Priority Data

Jun. 13, 1980 [DE] Fed. Rep. of Germany ....... 3022213

[51] Int. Cl.[4] ....................... C04B 35/00; C04B 35/48

[52] U.S. Cl. .................................... 501/103; 407/119; 416/241 B; 82/1 C; 501/87; 501/93; 501/94; 501/96; 501/97; 501/104; 501/105; 501/120; 501/127; 501/152; 501/153

[58] Field of Search ................................ 501/102–105, 501/94, 96–97, 87, 123, 127, 120, 115; 51/309; 416/241; 407/119

[56] References Cited

U.S. PATENT DOCUMENTS

| | | | |
|---|---|---|---|
| 2,271,369 | 1/1942 | Fulcher et al. | 501/105 X |
| 3,247,000 | 4/1966 | Taylor | 501/105 |
| 3,740,340 | 6/1973 | Riley et al. | 501/87 X |
| 3,761,295 | 9/1973 | Hulse et al. | 501/105 |
| 3,887,384 | 6/1975 | Hulse et al. | 501/104 |
| 3,891,408 | 6/1975 | Rowse et al. | 501/105 |
| 3,977,132 | 8/1976 | Sekigawa | 51/309 |
| 4,059,417 | 11/1977 | Iumaier et al. | 264/332 X |
| 4,126,429 | 11/1978 | Watson | 501/104 |
| 4,193,857 | 3/1980 | Bannister et al. | 204/426 |
| 4,218,253 | 8/1980 | Dworak et al. | 501/97 X |
| 4,221,650 | 9/1980 | Friese et al. | 501/105 X |
| 4,298,385 | 11/1981 | Claussen et al. | 501/105 |
| 4,308,067 | 12/1981 | Guigonis et al. | 501/105 |
| 4,314,827 | 2/1982 | Leitheiser et al. | 51/309 |
| 4,316,964 | 2/1982 | Lange | 501/105 |
| 4,331,048 | 5/1982 | Dworak et al. | 501/105 |
| 4,341,533 | 7/1982 | Daire et al. | 501/87 |
| 4,419,311 | 12/1983 | Claussen et al. | 501/94 |
| 4,533,647 | 8/1985 | Tien | 501/105 |

FOREIGN PATENT DOCUMENTS

| | | |
|---|---|---|
| 1176720 | 1/1970 | United Kingdom . |
| 2011952 | 7/1979 | United Kingdom . |

OTHER PUBLICATIONS

Levin, E. M. et al.–Phase Diagram for Ceramists–1975 Supplement–pub. by Am. Cer Soc., Columbus, Ohio, Index and Figures 4256, 4443–44–45; 4259, 4377–78, 227, 354, 2390, 4437, 579, 772, 4400.

*Primary Examiner*—Helen M. McCarthy
*Attorney, Agent, or Firm*—Toren, McGeady, Stanger, Goldberg & Kiel

[57] ABSTRACT

Ceramic shaped articles are disclosed which are formed of dense, non-metallic, mechanically resistant materials and contain eutectic constituents consisting of zirconium oxide, hafnium oxide and at least one other high-melting oxide and mixtures thereof. The composition exhibits excellent hardness, wear properties and bending strength. A method for preparing the articles is also disclosed wherein the appropriate mixture in a hypoeutectic, eutectic, or hypereutectic ratio is heated to its melting point, poured into a preheated mold and cooled.

2 Claims, 7 Drawing Figures

SINTERED CERAMIC SHAPED ARTICLE WHOLLY OR PREDOMINANTLY OF EUTECTIC MICROSTRUCTURE CONSTITUENTS

CROSS-REFERENCE TO RELATED APPLICATIONS

This application is a continuation-in-part of our copending application Ser. No. 271,216, filed June 8, 1981 abandoned, the contents of which are hereby incorporated by reference.

BACKGROUND OF THE INVENTION

1. Field of the Invention

The present invention relates to a ceramic shaped article based on dense, non-metallic, mechanically resistant materials, such as, for example, high-melting metal carbides, metal nitrides, metal borides and metal oxides, especially aluminum oxide and zirconium oxide.

2. Description of the Prior Art

Ceramic shaped articles of sintered materials have already found usage in wide areas of industrial technology. They are used especially where a high degree of hardness, good resistance to wear and good temperature resistance are required. Further broadening of the use of these materials is limited, however, because they have too low a bending strength for many fields of application, and an inadequate fracture toughness, expressed as $K_{Ic}$-value.

Numerous attempts to improve the mechanical strength of sintered ceramic shaped articles have been made. Thus, DE-OS No. 25 49 652 discloses the intercalation of materials existing at room temperature and combustion temperature in various enantiotropic solid modifications. On cooling the shaped articles after the combustion process, microfissures form which are capable of absorbing forces acting upon the shaped article by means of subcritical growth.

According to a more recent proposal by the present inventors and disclosed in DE-OS No. 27 44 700, a sintered material contains zirconium oxide and/or hafnium oxide in metastable tetragonal modification at room temperature (corresponding to U.S. Pat. No. 4,218,253) Stress acting on a shaped article produced from such a sintered material results in conversion of the metastable tetragonal modification into the monoclinic modification with consequent absorption of the applied stress.

In the past, it has been found that neither the storing of relatively coarse particles and the resulting generation of microcracks according to German DE-OS No. 25 49 652 (Claussen) nor the storing of $ZrO_2$ particles present in the metastable tetragonal modification in the range of 0.05 to 2 $\mu$m (Dworak) are sufficient in each case. On the contrary, it has been found that an extremely uniform structure with a very small particle size must be present in order to obtain especially good material characteristics.

SUMMARY OF THE INVENTION

We have discovered a composition for shaped ceramic articles with improved physical properties, such as, hardness, wear properties, and thermoshock resistances, and especially, improved bending strength and $K_{Ic}$-value. We have also discovered a method for making such articles.

More particularly, the present invention comprises a shaped ceramic article with substantially improved properties based on dense, non-metallic, mechanically resistant materials containing one or more eutectic microstructural constituents of zirconium oxide and/or hafnium oxide and at least one other high-melting metal oxide, or consisting in its entirety of these eutectic microstructural constituents.

The ceramic shaped article of the present invention is manufactured by heating a powdered composition in a hypoeutectic, eutectic, or hypereutectic ratio to its melting point and introducing the molten composition to a preheated mold having the desired shape and then allowing the composition to cool.

For the purpose of simplification, the invention is described herein using zirconium oxide as an example of one of the eutectic microstructural constituents. However, it is understood that this description applies analogously to hafnium oxide. This is especially so since commercially available zirconium oxide materials frequently contain traces of hafnium oxide and hafnium oxide has essentially the same properties with respect to the conversion of the metastable tetragonal modification into the monoclinic modification.

The shaped articles according to the invention are advantageous in that the structural constituents formed in the eutectic reaction are present in a homogeneous fineness that could not be achieved in shaped articles using the previous technology. This is the case even with the most careful grinding and sorting of the starting powders previously used for the production of sintered ceramic shaped articles. Such mixtures contain both in their lower and upper size range large numbers of particles which differ from the mean by about three to ten times the mean value. In contrast, the large variation in the metal oxide and zirconium oxide crystallites formed in the eutectic reaction is minimal and consequently leads to a structure of extremely high homogeneity. It is thus possible to produce ceramic shaped articles having a high proportion of zirconium oxide and having an extremely fine and homogeneous distribution in a manner substantially improved over the prior art processes. The proportions of zirconium oxide are present to a substantial extent in a metastable tetragonal modification.

When mechanical forces act on the ceramic shaped article according to the invention, the crystallites present in metastable tetragonal modification are converted into the monoclinic modification stable at room temperature. As a result, substantially higher energy absorption is rendered possible due to the high proportions of $ZrO_2$.

DESCRIPTION OF THE PREFERRED EMBODIMENT

Figure 1:
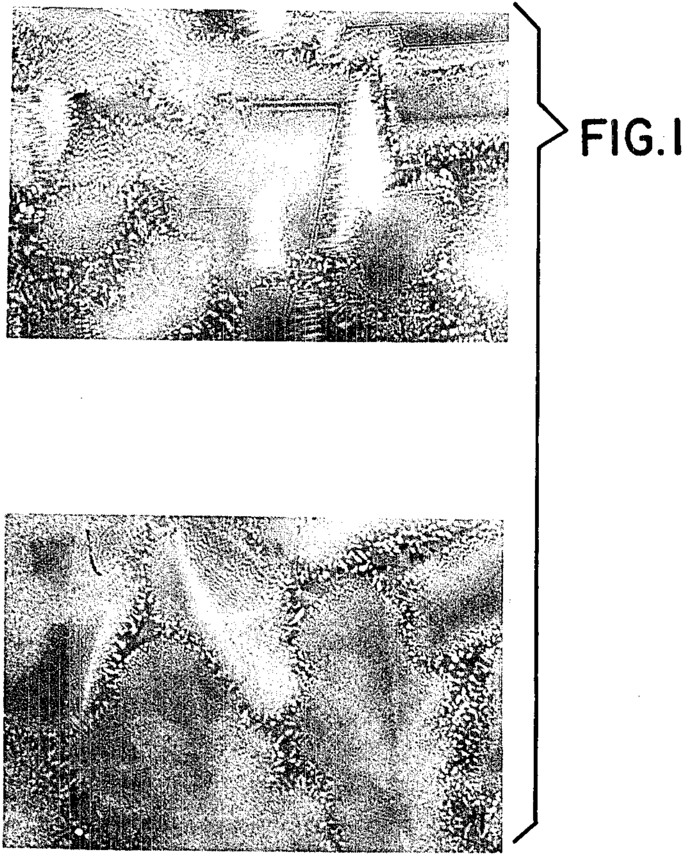
FIGS. 1 through 6 microphotographs of compositions described in the examples.

In addition to zirconium oxide and/or hafnium oxide, the ceramic shaped articles contain in a preferred embodiment, as further eutectic microstructural constituent, beryllium oxide.

Especially preferred, however, is a ceramic shaped article which is characterized in that, in addition to zirconium oxide and/or hafnium oxide, aluminum oxide is present in the eutectic microstructural constituents. A shaped article of this kind has a high resistance to temperature and from the point of view of production engineering, is especially advantageous and economical to produce.

By using eutectic micro-structural constituents, it is possible to adapt the ceramic shaped articles to the particular field of application to a much greater extent than possible by prior art methods. To produce ceramic shaped articles having especially good strength properties, it has proven advantageous to use a high proportion of eutectic microstructural constituents. The higher the proportion of these constituents, the better the strengths that can be achieved. In an especially preferred embodiment, therefore, a ceramic shaped article consists wholly or predominantly of a eutectic microstructural constituent of aluminum oxide, zirconium oxide and/or hafnium oxide.

A further improvement is where a ceramic shaped article consists wholly or predominantly of a eutectic microstructural constituent of aluminum oxide, zirconium oxide and/or hafnium oxide which, in addition, contains yttrium oxide and/or magnesium oxide and/or ytterbium oxide. Such a eutectic has an even finer distribution of zirconium oxide than is the case when oxides of yttrium, magnesium and ytterbium, which reduce the melting point, are not used.

It is possible to obtain even better conformity to the required profile with a composition which contains or consists of at least two eutectic microstructural constituents of different melting points, at least one of the eutectic microstructural constituents containing yttrium oxide and/or magnesium oxide and/or ytterbium oxide.

Although the effect of the property improvement strived for is obtained best when the constituents zirconium oxide and/or hafnium oxide and the further metal oxides are present in a percentage composition in which they form a eutectic, it is by all means within the scope of the invention, and can be advantageous for achieving certain effects, also to operate outside the eutectic composition. In this case, a composition within the hypoeutectic or hypereutectic range is used so that firstly, high-melting metal oxides or excess zirconium oxide and/or hafnium oxide are separated as a primary phase. Then, the eutectic microstructural constituent or constituents are separated. Since these initially-separated particles are in a more homogeneous distribution than can be achieved by conventional mixing and grinding methods, the resulting shaped articles also possess good wear properties, thermoshock resistance and a high degree of hardness. This is especially so since the effect of the eutectic microstructural constituents is fully retained even when operating in the hypoeutectic or hypereutectic range.

Ceramic shaped articles according to the present invention can be manufactured using customary processes and devices. However, for more complicated structural forms, it is important that the rate of cooling of the ceramic shaped article, and thus, the formation of the eutectic microstructural constituents, be regulated to achieve high homogeneity in the spacing of the individual zirconium oxide crystallites and a small particle size. It is thus surprising that one can obtain an especially fine and homogeneous distribution of the individual crystallites by shock-type quenching of ceramic shaped articles.

For manufacture of articles having complicated structural forms, a powder composition in the hypoeutectic, eutectic, or hypereutectic ratio is heated to the melting point. It is then hardened in a mold having the desired end shape. This mold is preheated, preferably to the melting point. This prevents cracks from appearing in the shaped article which would make it useless.

By using a preheated mold, the forming shaped article can be cooled off in a homogeneous and controlled manner over its entire cross-section. As a result, the shaped article retains a homogeneous structural arrangement and uniform mechanical and physical properties, e.g., strength, hardness, coefficient of elasticity, density and heat conductivity, over its entire profile. For articles used as stressed structural components, uniform bonding strength, as possessed by the articles of the present invention, are particularly important.

The uniformity of these properties can be further enhanced by adding yttrium oxide, magnesium oxide and ytterbium oxide. Using such mixtures, slower or medium cooling off rates, for instance, 50° K./min., can be used. These additives also make it possible to influence the eutectic microstructural constituents in regards to their form and distribution. Thus, using the present process, sphere shaped deposits of zirconium oxide can be obtained which have an especially advantageous effect on the mechanical properties of the shaped article.

The molds used for forming the shaped article from the melt, are made of high temperature resistant materials, i.e., refractory materials. Graphite is particularly suitable for this purpose. Graphite is particularly advantageous when it is lined with non-reactive metals having a high melting point, such as, molybdenum, or with non-metals having a high melting point, such as, boron nitride. This avoids reactions between the melt and the carbon of the graphite. An inert gas atmosphere, e.g., argon, may be used to prevent reactions between the mold and/or the mold lining and the atmospheric oxygen. It is also possible to use a mold made of refractory oxidation resistant metals, such as, for example, iridium.

In the manufacture of ceramic shaped articles with especially high strengths, a powder of several metal oxides is mixed in a hypoeutectic, eutectic, or hypereutectic ratio, is melted and then after rapid cooling, pulverized. The article shaped from the resulting powder and sintered or pressure sintered, is very advantageous. This process is preferred because the nature and proportion of the eutectic structural constituents can be varied, depending on whether the operation is in the hypoeutectic, hypereutectic or precise eutectic range. The sintering temperatures used are usually below the melting point of the individual components.

In another embodiment of the present invention, a first powder is mixed in hypoeutectic, eutectic or hypereutectic ratio, melted and, after rapid cooling, pulverized. A pulverulent article is shaped from the mixture of the first powder and the added pulverulent metal oxide is sintered or pressure sintered.

For certain combinations of materials, it is useful to use a sintering process in which one of the material components is in the liquid phase. In another embodiment, a first powder is mixed in a hypoeutectic, eutectic or hypereutectic mixing ratio, melted and, after rapid cooling, pulverized. A second powder is admixed with the first powder which second powder consists of a high-melting carbide, metal nitride, metal boride or metal oxide or of a combination of these components. The article is shaped from the mixture of the two powders and sintered or pressure sintered above the melting point of the first powder and below the melting point of the lowest melting component of the second powder. In this process, the liquid phase etches the surface of the particles of the second powder which remains in the solid state. The tensions at the grain boundaries of the particles of the second powder caused by expansion anisotropies are thus reduced and as a result, higher strengths are obtained. Preferably, the proportion of the liquid phase is 5 to 25% by volume.

In another embodiment of the invention, a powder consisting of metal oxides is mixed in hypoeutectic, eutectic or hypereutectic ratio and is melted. After rapid cooling, it is pulverized and a second such powder to which yttrium oxide and/or magnesium oxide and/or ytterbium oxide is admixed is melted. After rapid cooling, it is pulverized, and an article is shaped from the mixture of the two powders and sintered or pressure sintered. The sintering temperatures used are above the melting point of the lower melting powder and below the melting point of the higher melting powder.

For the manufacture of a ceramic shaped article that contains several different eutectic microstructural constituents and other non-metallic mechanically resistant materials, a particularly suitable process is one wherein a first powder is mixed in hypoeutectic, eutectic, or hypereutectic ratio, melted and after rapid cooling, pulverized. Then, a second powder in hypoeutectic, eutectic or hypereutectic composition which, in addition, contains yttrium oxide and/or magnesium oxide and/or ytterbium oxide, is mixed, melted and, after rapid cooling, pulverized. Finally, a third powder consisting of a high melting metal carbide, metal nitride, metal boride or metal oxide or of a combination of these components is added to the mixture of the first and second powders. An article is then shaped from the mixture of powders and sintered or pressure sintered above the melting point of the lowest melting powder and below the melting point of the other powders. In addition to the already mentioned advantages of the sintering processes in which a liquid phase is used, there is the further advantage that, as a result of mixing the liquid with the solid constituents, an extraordinarily good distribution of the eutectic constituents dispersed in the liquid phase, with the remaining constituents of the shaped article used in solid form, is achieved.

A great variety of shaped articles can be manufactured according to the present invention, for example, cutting tools, turbine blades, friction discs, mechanical seals, thread guides, extrusion dies, rocker tappets, cylinder liners, and valve discs.

The following examples illustrate the present invention:

EXAMPLE 1

35 g of monoclinic zirconium oxide powder, 45 g of aluminum oxide powder and 20 g of yttrium oxide powder are mixed and ground for 30 minutes in a ball mill. 0.15 1 of water is used as mixing liquid. The resulting powder mixture is dried and sieved so that any particles larger than 630 μm are removed. Cylindrical shaped tablets are pressed from this powder mixture to make handling easier.

The cylindrical shaped tablets are melted in a graphite crucible at 2000°±50° C. in an argon atmosphere (130 mbar) and then cooled to room temperature at approximately 50 K/min. Small prismatic rods of a dimension of 13×2.5×3.5 mm are prepared from the melt product and lapped with boron carbide. The bending strength $\sigma_{bB}$ of these test articles is 410±40 N/mm² and the fracture resistance $K_{Ic}$ is 160±15 N/mm$^{3/2}$ (saw cut method with notch radius ~30 μm). The microhardness gives a value of $H_v$ of 18.6 kN/mm².

The structure comprises a primary precipitated dendritic $ZrO_2$-rich phase, a eutectically solidified structural constituent consisting predominantly of $Al_2O_3$ and $ZrO_2$ and a third structural constituent formed from $Al_2O_3$, $ZrO_2$, and $Y_2O_3$. In the latter structural constituent, the ZrO 2-rich phase is present in extremely finely divided form predominantly in the transition zone between the likewise finely divided $Y_2O_3$ and $Al_2O_3$-rich phases of this structural constituent.

The mean particle size of this $ZrO_2$ is below 500 nm.

EXAMPLE 2

Zirconium oxide and aluminum oxide are mixed in eutectic ratio. The powder mixture is melted and, after rapid cooling, wet-ground in a vibration grinding mill for 32 hours. It is then dried and granulated. The resulting powder has a specific surface area (BET method) of 6 m²/g. This powder is hot-pressed in a graphite matrix at 1450° C. for 4 minutes at a pressure of 5.5 bar in an argon atmosphere. Small test rods identical to those in Example 1 are separated out from the resulting cylindrical shaped articles and the bending strength and fracture resistance are ascertained.

$$\sigma_{bB}=840\pm65 N/mm^2 \text{ and } K_{Ic}=450\pm50 N/mm^{3/2}$$

The microhardness $H_v$ is 14 kN/mm$^{3/2}$, ascertained with a load of 500 g using a Vickers pyramid.

The eutectic structure comprises a continuous $Al_2O_3$-rich phase and, distributed therein in extremely fine and homogeneous form, a predominantly small rod-shaped $ZrO_2$-rich phase. The $ZrO_2$ small rods, lamellae or ellipsoids have a mean diameter of 200 nm and a mean spacing of 500 nm.

EXAMPLE 3

50 g of the powder of zirconium oxide and aluminum oxide in eutectic composition prepared in Example 2 are ground with 445 g of $Al_2O_3$ (mean particle size 0.7 μm, BET specific surface area 7.4 m²/ g) and 5 g of spinel, provided with polyvinyl alcohol as binder, sprayed, dry-ground again in a vibration grinding mill for 13 hours, moistened with water, granulated and sieved to remove particles above 630 μm. Test articles (6×4×32 mm) are pressed from the resulting granulate at 1500 bar and sintered under argon, without pressure, for 80 minutes at 1750° C. and 130 bar.

The resulting shaped articles had the following strengths:

$$\sigma_{bB}=380\pm30 N/mm^2 \text{ and } K_{Ic}=210 N/mm^{3/2}.$$

EXAMPLE 4

A mixture of 35 g of monoclinic zirconium oxide power, 45 g aluminum oxide powder and 20 g of yttrium oxide powder is formed into a turbine blade by melting and being poured under an atmosphere of argon as protective gas, into a graphite mold which has been heated to 2000° C. and having an inner lining of molybdenum. Subsequently, the mixture is cooled off at a rate of 50 K/min.

EXAMPLE 5

Powder mixtures were prepared from the composition described in the following table. The powder mixtures were melted in an argon atmosphere at 1900° C. for 15 minutes and after a quick cooling of the melt, the melt was comminuted into a powder having an average particle size of 0.9 μm. Bodies were formed from this powder by hot pressing at the stated temperatures and dwell periods at a pressure of 300 bar.

TABLE

| | % $Al_2O_3$ | $ZrO_2$ | $HfO_2$ | $Y_2O_3$ | $Yb_2O_3$ | °C. | Minutes |
|---|---|---|---|---|---|---|---|
| 1 | 57 | 38 | | | 5 | 1400 | 5 |
| 2a | 60 | | 40 | | | 1450 | 5 |
| 2b | 60 | | 40 | | | 1500 | 4 |
| 3 | 57 | | 38 | 5 | | 1400 | 4 |
| 4 | 57 | | 38 | | 5 | 1400 | 4 |
| 5 | 50 | 25 | | 25 | | 1400 | 4 |
| 6 | 49 | 28 | | 23 | | 1400 | 4 |

The figures are microphotographs of the products obtained and can be described as follows:

FIG. 1 Eutectic structural constituents of $Al_2O_3$/$ZrO_2$/$Yb_2O_3$ and primary separated $Al_2O_3$.

Figure 2A:
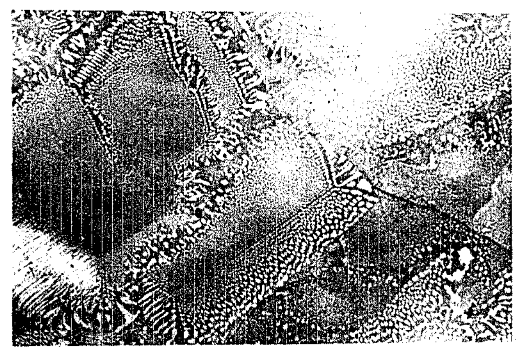
Figure 2B:
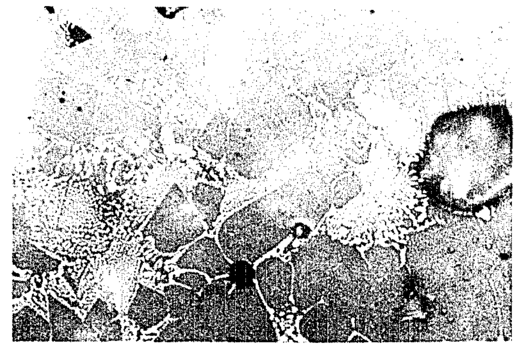
Figure 2B:
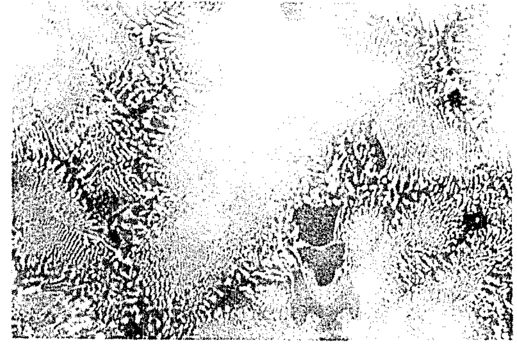

FIG. 2*a* and 2*b* Eutectic structural constituents of $Al_2O_3$/$HfO_2$ and primary separted $Al_2O_3$.

Figure 3:
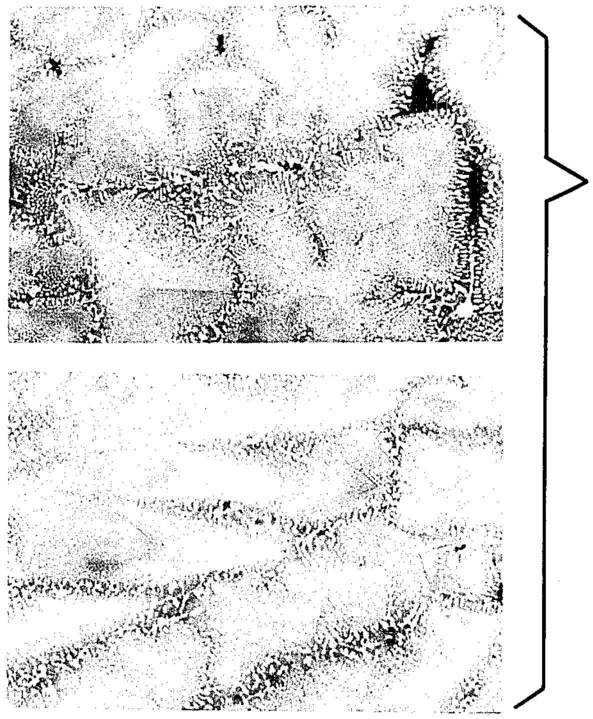

FIG. 3 Eutectic structural constituents of $Al_2O_3$/$HfO_2$/$Y_2O_3$ and primary separated $Al_2O_3$.

Figure 4:
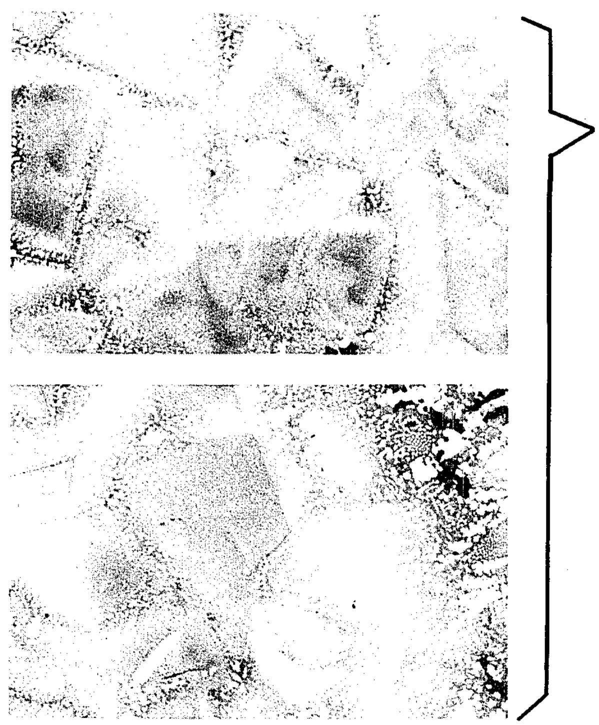

FIG. 4 Eutectic structural constituents of $Al_2O_3$/$HfO_2$ and $Yb_2O_3$ and primary separated $Al_2O_3$.

Figure 5:
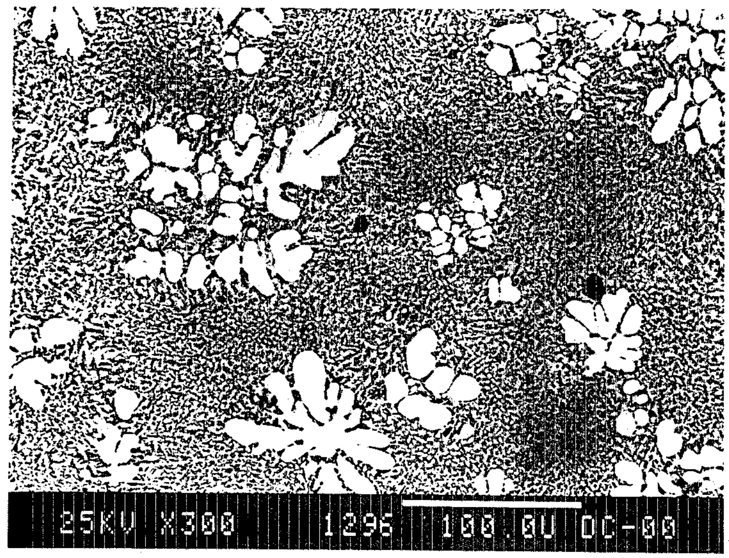

FIG. 5 Eutectic structural constitutes of $Al_2O_3$/$ZrO_2$/$Y_2O_3$ and primary separated $ZrO_2$.

Figure 6:
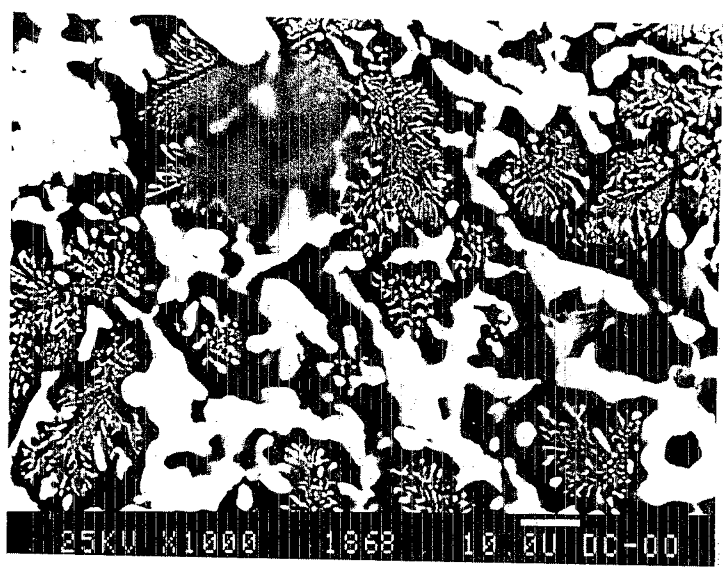

FIG. 6 Ternary eutectic structural constituents of $Al_2O_3$/$ZrO_2$/$Y_2O_3$.

We claim:

1. In a sintered ceramic shaped article in the form of cutting tools, turbine blades, and similar articles which exhibit excellent hardness wear properties and bending strength, formed by sintering or hot pressing a mixture of dense, non-metallic, mechanically resistant ceramic powders, the improvement which comprise said mixture consisting wholly or predominantly of eutectic microstructures selected from the group consisting of aluminum oxide/zirconium oxide, beryllium oxide/zirconium oxide, aluminum oxide/hafnium oxide, aluminum oxide/zirconium oxide/ytterbium oxide, aluminum oxide/hafnium oxide/yttrium oxide, aluminum oxide/hagnium oxide/ytterbium oxide, aluminum oxide/zirconium oxide/yttrium oxide, aluminum oxide/magnesium oxide/zirconium oxide, and aluminum oxide/magnesium oxide/hafnium oxide and wherein particles of zirconium oxide and hafnium oxide within the eutectic microstructures are in an extremely fine and homogenous distribution and are present to a substantial extent in a metastable tetragonal modification.

2. The ceramic shaped article of claim 1, wherein the variation in size between the crystallites of zirconium oxide, hafnium oxide and metal oxides within the eutectic microstructures differs less than three times from their mean value.

* * * * *